United States Patent [19]

Partel

[11] Patent Number: 5,379,941
[45] Date of Patent: Jan. 10, 1995

[54] ELECTROMAGNETIC FEED DEVICE FOR VARIABLE FORWARD MOTION OF SOLDER WIRE OR WELDING WIRE IN A SOLDERING IRON OR WELDING GUN

[76] Inventor: Robert Partel, Postfach 34 19, CH 3600 Zug, Switzerland

[21] Appl. No.: 991,651

[22] Filed: Dec. 16, 1992

[30] Foreign Application Priority Data

Dec. 16, 1991 [DE] Germany .................. 9115533[U]

[51] Int. Cl.⁶ ................................................. B23K 3/06
[52] U.S. Cl. ........................................ 228/33; 228/41; 228/52; 226/167
[58] Field of Search ............... 228/33, 52, 244, 247, 228/41; 219/85.16, 85.18; 226/167, 151, 139

[56] References Cited

U.S. PATENT DOCUMENTS

| | | | |
|---|---|---|---|
| 2,604,064 | 7/1952 | Sefton | 226/167 |
| 3,390,826 | 7/1968 | Davis | 228/53 |
| 3,437,252 | 4/1969 | Beaver et al. | 228/53 |
| 3,990,622 | 11/1976 | Schurman, Jr. et al. | 228/53 |
| 4,199,096 | 4/1980 | Keefe et al. | 226/167 |
| 5,031,817 | 7/1991 | Chen | 228/52 |

FOREIGN PATENT DOCUMENTS

| | | | |
|---|---|---|---|
| 1752229 | 4/1968 | Germany . | |
| 7027356 | 7/1970 | Germany . | |
| 253345 | 12/1985 | Germany . | |
| 3639645 | 11/1986 | Germany . | |
| 863211 | 9/1981 | U.S.S.R. | 228/33 |
| 1530361 | 12/1989 | U.S.S.R. | 228/33 |

Primary Examiner—P. Austin Bradley
Assistant Examiner—Jeffrey T. Knapp
Attorney, Agent, or Firm—Browdy and Neimark

[57] ABSTRACT

A feed device for a soldering iron possesses a coil through which current flows, located in the soldering iron itself, and an armature that is displaceably driven in the central bore of the coil. This armature cooperates with a clamping device connected to it. Thus, an intermittent clamping and feeding action may be effected in the clamping device. Such a device is space saving and has substantially no parts subject to wear.

7 Claims, 5 Drawing Sheets

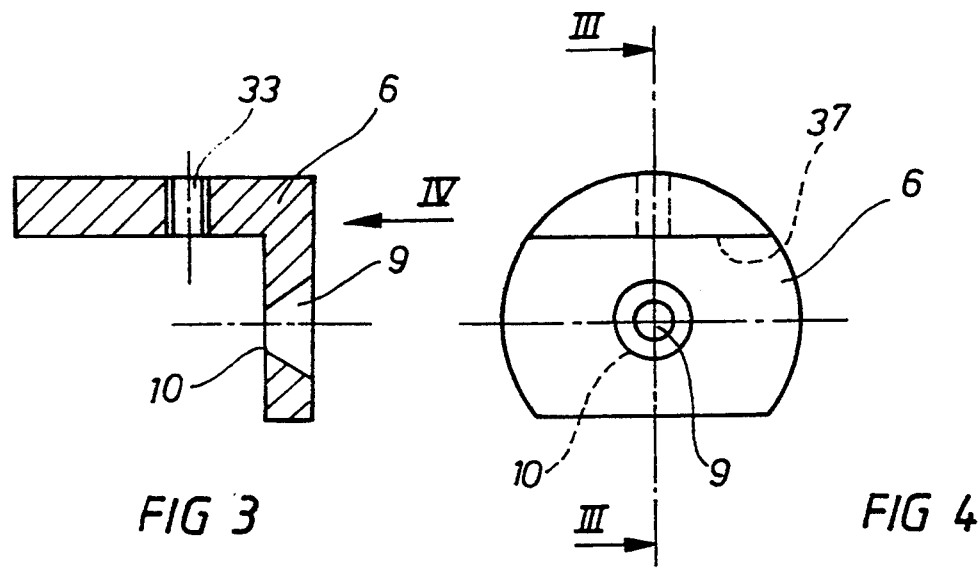
FIG 3
FIG 4
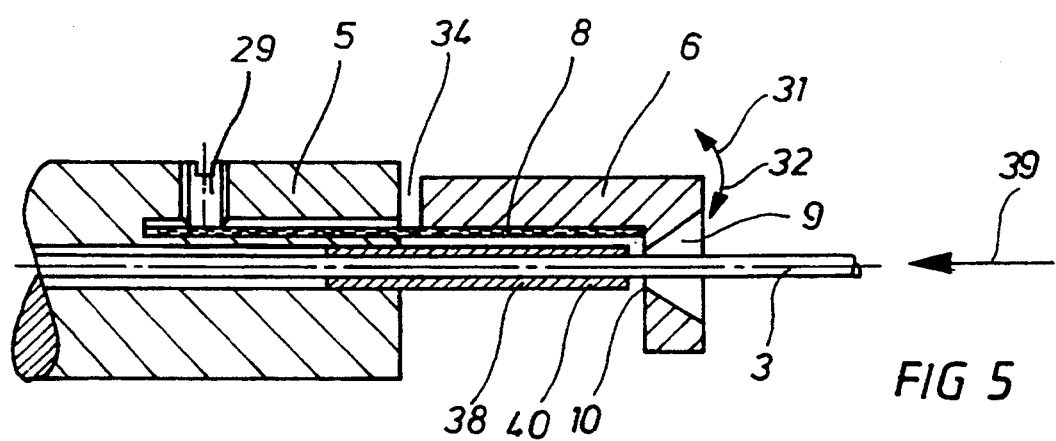
FIG 5
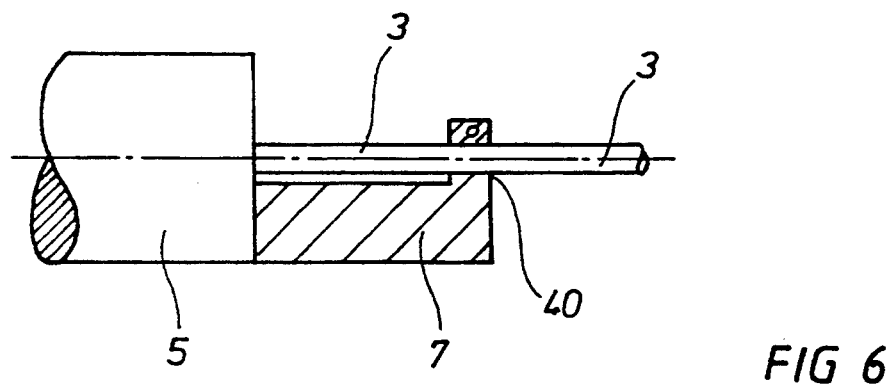
FIG 6

ELECTROMAGNETIC FEED DEVICE FOR VARIABLE FORWARD MOTION OF SOLDER WIRE OR WELDING WIRE IN A SOLDERING IRON OR WELDING GUN

BACKGROUND OF THE INVENTION

TECHNICAL FIELD OF THE INVENTION

The invention relates to a feed device. One such feed device has become known as the subject of DE 36 39 65, for instance. In this known feed device, the feed movement is attained by means a disk driven to rotate by an electric motor and cooperating with a connecting link guide that converts the rotary motion into a longitudinal motion of a carriage. A toggle lever mechanism is disposed in the region of this carriage and cooperates with a pair of tongs, so that on the displacement of the complete carriage, the tongs come into engagement with the wire to be transported and selectively grasp and release it.

The disadvantage of the known feed device is that it is a complicated and expensive drive mechanism that requires a great amount of space and moreover works only in such a manner as to be vulnerable to wear.

In another known device according to the U.S. Pat. No. 3,990,622, the solder wire is transported by the form-fitting engagement of the solder wire by a toothed disk that is driven to rotate by intermittent thrusts. In this way. as a result of the rotary drive of the toothed disk, an intermittent feeding of the solder wire is attained.

The disadvantage of that known feed device, however, is that the arrangement once again takes up a relatively large amount of space, because the transport station cannot be integrated into a soldering iron, and that it works with electromagnetically moved parts, which makes it vulnerable to wear and needs frequent maintenance.

SUMMARY AND OBJECTS OF THE INVENTION

It is accordingly the object of the invention to improve a feed device of the generic type referred to at the outset such that it is small and can be space-savingly integrated into a soldering iron, has substantially no parts subject to wear, and can be produced economically.

The characteristic of the invention is that there is a coil through which current flows, located in the soldering iron itself, and an armature is displaceably driven in the central bore of the coil; this armature cooperates with a clamping device connected to it, and an intermittent clamping with a feeding action is effected in the clamping device.

With this technical teaching, the substantial advantage is attained that an extraordinarily compact, space-saving structure is attained, because this kind of armature with the coil belonging to it can be integrated into the grip of a soldering iron itself, yet its construction does not require soldering irons that take up a large amount of space, of the kind known in the prior art.

With the integration of the device according to the invention in a soldering iron, the essential advantage is accordingly attained that the soldering iron can be guided in a finely metered manner by hand, without requiring the guidance of a complicated and heavy soldering gun.

There is also the advantage that because only a few moving parts (armature and clamping part) are present, manufacture is very economical, practically no maintenance is necessary, and the arrangement is quiet in operation.

Another substantial feature is that a reciprocating motion of an armature is generated in the region of a coil through which current flows; there are various options for generating this reciprocating motion.

In a first embodiment, it is provided that the armature comprises a soft iron material, and that the electrical coil has a pulsating direct current flowing through it. In the simplest embodiment, the alternating voltage of the power supply is unilaterally rectified for that purpose; that is, a half-wave is cut off as a result, and with the remaining pulsating half wave the electrical coil is supplied with current, which leads to a pulsating direct voltage. Such a construction is very simple, because only a single diode is needed to generate this kind of pulsating direct voltage. When a thus-pulsating direct voltage is used, it is assumed that an appropriate longitudinal motion into the inside of the coil in the feed direction is executed in order to assure that the armature, because of the short current flow through the coil by means of a half wave, has sufficient time. Operation of the coil with pure alternating current from the power supply is equally possible, but then the armature has an oscillating frequency of 100 Hz, which produces only a relatively slight feed motion of the solder wire. However, that embodiment is also intended to be encompassed by the present invention.

The first embodiment mentioned above is preferred, however, in which the armature oscillates in the coil at an oscillating frequency of 50 Hz, and the precondition then is that the armature is pulled only in the feed direction into the coil by the magnetic flow of force, while the contrary motion is effected by a restoring element onto which the armature runs up. This kind of restoring element may be a compression spring, for instance, or a slewing spring, a spiral spring, a flexibly elastic element such as a rubber bellows, a pneumatic element, a gas compression spring, or the like.

This flexible element moves the armature, which continues to be pulled into the coil by the flow of current, backward again counter to the feed direction of the solder wire, which ends one oscillation cycle of the armature.

It is important that the armature according to the invention is connected to a clamping device which is capable, as a function of the armature motion, of clamping the solder wire form-fittingly at a specific defined point and releasing it again—again as a function of the motion of the armature. In this way a variable forward motion of the solder wire is attained; a prerequisite is that the solder wire be guided through a delivery tube to the soldering tip and in this delivery tube the solder wire undergoes a frictional resistance, in order to assure that it will be released by the clamping device upon the reverse motion of the armature.

Accordingly, the clamping device clamps the solder wire when the armature is moving forward in the feed direction, while when the armature is moving backward (in other words counter to the feed direction of the solder wire), the solder wire is released by the clamping device.

The clamping device preferably comprises a clamping part, which has a clamping blade that digs positively into the solder wire and reliably holds this solder wire firmly.

This has the advantage that even relatively thin solder wires can be securely grasped, without the danger that the solder wires will be severed or that unacceptably pronounced notches will be made on these solder wires. The field of the present invention therefore extends no only to the variable forward motion of solder wires in soldering irons, but also to the forward motion of welding wires in welding guns, or to other fields of application, such as the forward motion of unsoldering cords in soldering irons and other appliances in which a variable forward motion of a wire and the like is critical.

A further use of the electromagnetic feed device is in cable drive mechanisms, where a cable is guided for revolution and in the process the cable is transported intermittently with the feed device according to the invention. Other fields to which the invention applies are drives for cable retraction in the installation field, or in a drum winding unit. A further use exists in any equipment where a wire or bar drive is used.

The feed device of the invention can also be employed in tensioning tongs, on the principle of the feed of a mechanical pencil, where the lead is set into a feeding motion. In this way, the feed device according to the invention can also be used to check and release tools that are used in industry, where the need is first to check the tool, in the manner of a checking motion and then loosen it or eject it from the tool holder in a feed motion.

Because it is possible to use thinly dimensioned solder wires, there is the advantage in the improvement in soldering quality, because the thinner solder wire can now be heated faster and the soldering location is made clean. The use of a more thinly dimensioned solder wire also has the advantage that the solder wire causes less mechanical injury to the soldering tip against which it is pressed.

Because the entire feed device is integrated into a relatively small-sized soldering iron, it is now possible for the first time to use even very thin wires in soldering irons that draw only very little power; soldering can now be done with only one hand even for very vulnerable soldering, as in the case of 10-watt soldering irons, for instance, which are used for vulnerable electronic parts.

It is accordingly possible for the first time for the solder wire itself, in the form of a coil of solder wire, to be integrated into the soldering iron itself, in particular in its rearward end; in that case, the solder wire is stored in the form of a helix in the rear end of a bore, and the solder wire is then guided to the soldering tip by the feed device. This has the advantage that the solder wire can easily be replaced, and a lighter-weight soldering iron is created as an overall result.

With the technical teaching according to the invention, the advantage is attained that because of the actuation of a single pulse key, an accurately defined feed travel of 3 mm, for instance, is now attained. The feed length depends on various factors, namely on the power taken up by the coil, the drawing resistance (frictional resistance at the solder wire), the thickness of the solder wire, and stops that might possibly be built in in the soldering wire and that adjustably limit the longitudinal motions of the armature. A variable forward motion of the solder wire can thus be attained by varying these variables.

Because of the relatively low power consumed by such a coil, 4 W, for instance, it is now also possible for the complete soldering iron along with the feed device to be driven using a battery.

In a preferred first embodiment of the present invention, the clamping device is embodied as a resiliently supported clamping sleeve.

With this kind of clamping device, it is important that a retaining element which defines a first, rigid bore through which the solder wire is guided, be connected to the armature. A clamping part having a second bore and supported pivotably to the longitudinally movable armature is pivotable with respect to this rigid bore of the retaining part, the retaining part being joined directly and firmly to the armature. Pivoting of the clamping part with its bore, which is embodied as a clamping blade, relative to the stationary bore of the retaining part accordingly causes a displacement of the bores, which in the position of repose are aligned with one another, and the wire is clamped in place and notched between the two bores.

According to the invention, this pivoting motion of the clamping part with its clamping bore in comparison with the stationary bore of the retaining part is effected by the magnetic field of the coil itself. To this end, it is provided that the clamping part on one side is supported, resiliently pivotably, on one end of the armature; a spiral spring is preferably used as the supporting element. Instead of a spiral spring, however, other spring elements may also be used, such as a plastic spring, or a plastic sleeve, which is embodied as intrinsically resilient.

When the electrical coil is excited with current, a magnetic field oriented longitudinally is created, which pulls the armature of soft iron material into the coil. Simultaneously, however, radial fields are also created, which seek to tilt the armature. However, since although the armature is displaceably guided in a longitudinal bore in the coil it is secured against tilting, the armature itself cannot tilt.

The clamping part is joined to one end of the armature and is seated in a sleeve, which acts as a yoke, of larger diameter; that is, its diameter is larger than the diameter of the coil bore in whose opening the armature is movable. Because of the incident radial magnetic fields, the clamping part, which is also of a soft iron material, can accordingly tilt, so that the magnetic field generated in the radial direction by the coil acts upon this clamping part and tips it in the radial direction. A tipping motion at the armature is the result, causing the clamping bore of the clamping part now to be canted with respect to the stationary bore of the retaining part (which is joined to the armature). The desired notching effect on the soldering wire is thus attained.

Because the clamping part is supported with a spiral spring on the longitudinally movable armature, a release of the clamping device results upon a reverse motion of the armature (counter to the feed direction of the solder wire), because the spiral spring springs back again since the radial field is now switched off, as is the axial field which had pulled the armature into the coil in the feed direction. Accordingly, the spring returns the clamping part to a neutral central position, and as a result the two bores (the bore of the clamping part and the bore of the retaining part) arrive at an aligned position facing one another, and as a result the solder wire is released. An unintentional retraction of the solder wire in this reverse motion of the armature and clamping part and of the retaining part is avoided, because the solder wire is guided forward toward the soldering tip through a delivery tube, and a corresponding frictional resistance exists in this delivery tube that keeps the solder wire in its position.

When the solder wire is drawn from a solder core or helix, friction also occurs, which likewise prevents unintentional retraction of the solder wire counter to the feed direction.

The supply coil onto which the solder wire is wound may also be disposed in the body of the handle itself, specifically in such a way that the axis of the supply coil is disposed perpendicular to the feed motion. This has the advantage that no damage to the solder wire occurs and that the wire is protected against corrosion.

In a second preferred embodiment of the present invention, the clamping part substantially comprises a clamping diaphragm that has a central bore at which segmental clamping segments originate. The solder wire is guided by the central bore, which again represents the aforementioned clamping bore of the clamping part. This clamping diaphragm is permanently installed in the armature, and the solder wire then passes through the clamping bore of the clamping part, whereupon the clamping segments are deformed slightly outward and thus press positively against the surface of the solder wire. A stationary bore is again disposed in a retaining part of an armature, facing the clamping bore of the clamping part.

In this clamping part, the action of radial fields that cause a clamping part to tilt (as described above) is accordingly unnecessary; instead, this clamping part functions autonomously without the action of radial springs. The contrary holding forces for undoing the clamping are the same as those described above, namely the frictional resistances in the delivery tube of the solder wire toward the soldering tip and also the frictional resistances that the solder wire undergoes as it is unwound from the solder coil or helix to the clamping device. In a third embodiment of the present invention, the clamping device is not embodied as a clamping diaphragm. Instead, individual latchlike elements are pivotably supported in the armature and in turn dig positively into the surface of the solder wire; a plurality of latch elements may be disposed in the armature, uniformly distributed over the circumference.

In a further embodiment, although the plunger armature is guided in the electrical coil, nevertheless the clamping part is guided at an angle to the outside, and the feed of a solder wire or welding wire that is guided outside the electrical coil in a retaining part is brought about.

All of the indications and characteristics disclosed in the application—including the abstract—and in particular the three-dimensional embodiment shown in the drawings are claimed as essential to the invention, to the extent that individually or in combination they are novel over the prior art.

The invention will be described in further detail below in conjunction with drawings that show several embodiments. Further essential characteristics and advantages of the invention will become apparent from the drawings and their description.

BRIEF DESCRIPTION OF THE DRAWINGS

FIG. 3: a section through the clamping part in the direction of the line III—III of FIG. 4;

FIG. 4: an end view of the clamping part in the direction IV—IV of FIG. 3;

FIG. 5: an embodiment of a feed device that is modified compared with FIG. 2;

FIG. 6: an embodiment of a retaining part that is modified in comparison with FIG. 5;

DETAILED DESCRIPTION OF THE PREFERRED EMBODIMENT(S) OF THE INVENTION

Figure 1:
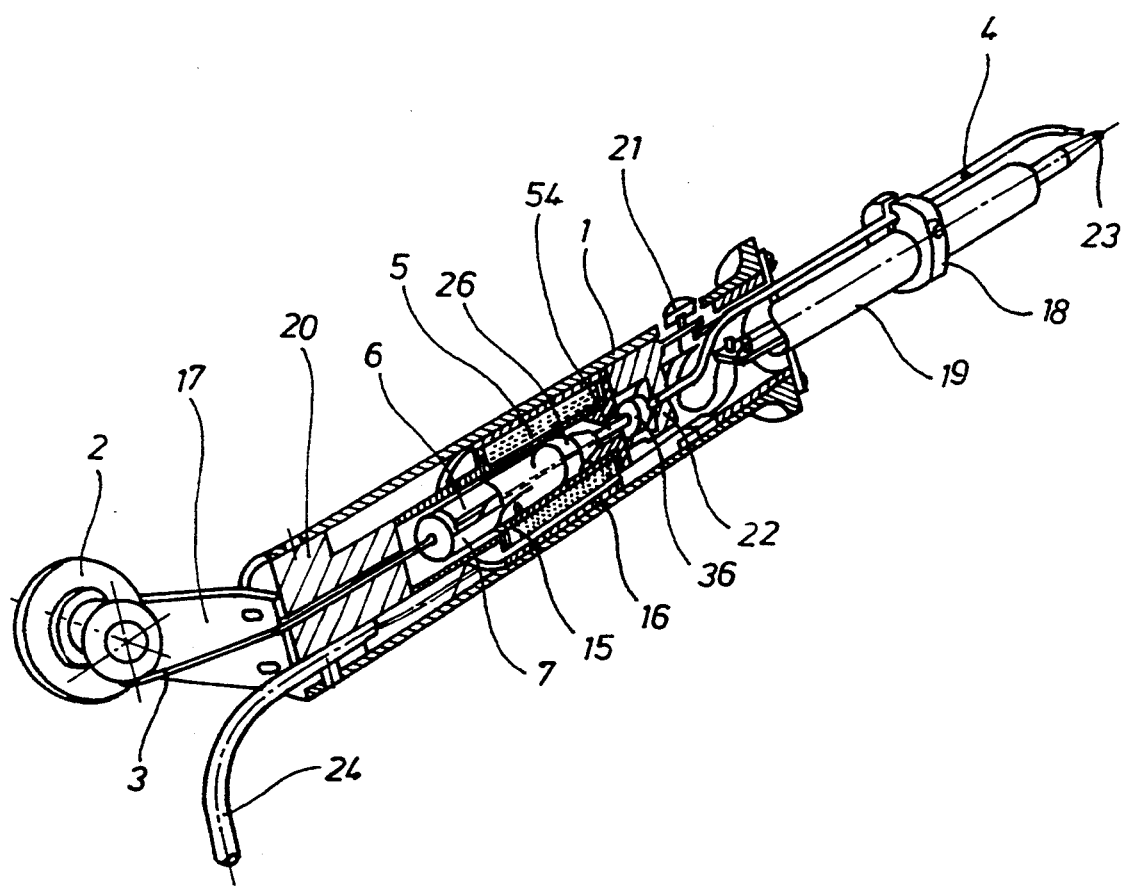
FIG. 1: schematically, a soldering iron according to the invention, seen partly in section, in a first embodiment.

The soldering iron according to the invention has a handle 1, in which a clamping device according to the invention is integrated. A soldering tube 19 is disposed on the front end of the soldering iron, and a delivery tube 4 through which the solder wire 3 is transported forward to the soldering tip 23 is disposed parallel to the soldering tube 19. The two parts 4, 19 are joined to one another by a clamping part 18.

A supply drum 2 is disposed at the rear end of the handle 1, and a solder wire 3 is wound on it in the form of a coil; the entire drum retainer 17 is disposed as a separate element at the back end of the handle 1.

In the invention, the delivery of the solder wire can also be done by means of a rotatable coil that is disposed externally, outside the soldering or welding tool. The solder wire is then preferably wound on a rotatable coil and from there enters the feed device according to the invention.

It is also possible for the solder wire or the supply drum to be disposed in the body of the handle itself, which has the advantage that no damage to the solder wire occurs, and the wire is protected against corrosion and soiling (dust, etc.).

Figure 7:
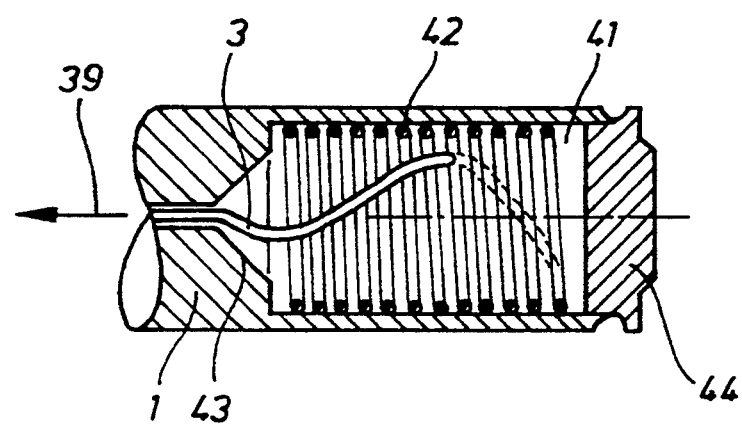
FIG. 7: a section through the rear portion of a soldering iron with integration of the solder wire coil in the rear part of the soldering iron.

In the invention, an instantaneous indication of the supply in the solder wire magazine is additionally provided, as seen in FIG. 7. This supply indication substantially comprises a slit in the rear region of the soldering iron or welding tool; the solder or welding wire wound in the manner of a coil can be viewed through the slit.

FIG. 7, to be described hereinafter, shows that instead of the drum retainer 17 shown in FIG. 1, the rear end of the handle 1 may have a central recess 41, in which a solder wire coil 42 in the form of a helix is disposed, from whose middle region the solder wire 3 is drawn out forward in the feed direction 39. The recess 41 is closed on the rear end by a cap 44. The forward end of the recess 41 is formed by a cone 43, so that the payout resistance on the solder wire 3 is kept as low as possible.

In a manner known per se, the cable 24 which contains the electrical supply for the heating cartridge is also passed through the handle 1.

A handle cover 20, on which the drum retainer 17 is secured, is also present on the rear end of the handle 1.

An electrical coil 15, which in a preferred exemplary embodiment has an axial length of 40 mm, for example, is disposed in the interior of the soldering iron. The outside diameter of an electrical coil of this kind may be in the range from approximately 10 to 20 mm.

In the interior of the electrical coil 15, an armature 5 is formed, which is movable in the feed direction 39 and counter to it; joined to the armature are a clamping part 6 and a retainer part 7. In the exemplary embodiment shown in FIG. 1, one end of the armature is embodied as a centering sleeve 26 (as also shown in FIG. 2), except that the centering sleeve 26 of FIG. 1 is additionally joined to a tube 54, which cooperates with a stationary stop 36. The tube 54 and the stop 36 are in one piece. The stop 36 may be rubber-elastic in embodiment, in order to avoid attendant impact noises.

In the exemplary of FIG. 2, contrarily, such a stop is absent. Both embodiments are intended to be encompassed by the concept of the present invention.

In the forward region of the handle 1, there is a switch key 21, upon whose actuation a flow of current through the electrical coil is generated constantly, as long as the switch key 21 is kept depressed.

In FIG. 2, the electrical coil 15 comprises an outer sleeve body 16, which is preferably of soft iron material. The electrical coil 15 is wound onto a sleeve body 11 located radially on the inside, which is likewise a plastic part, which is preferably embodied as abrasion-proof in its central inner bore.

The forward end of the armature 5 is embodied as a stop 53, and the aforementioned centering sleeve 26 is secured to this stop; the centering sleeve tapers conically on its rear end, and plunges into a corresponding centering cone 25, which is machined into a forward pole piece 13. The pole piece 13 has a central bore 28, through which the solder wire 3 is guided.

A restoring spring 12, preferably embodied as a helical compression spring, is supported by one end on the rear pole piece 13 and by its other end on the stop 53 of the armature 5.

The rear region of the electrical coil 15 is defined by a forward pole piece 14, which comprises a nonmagnetic material.

It is preferred that the forward pole piece 13 comprise a magnetizable material; however, this is not necessary to the invention; the rear pole piece 14 may also comprise either a magnetizable or a nonmagnetizable material.

Figure 12:
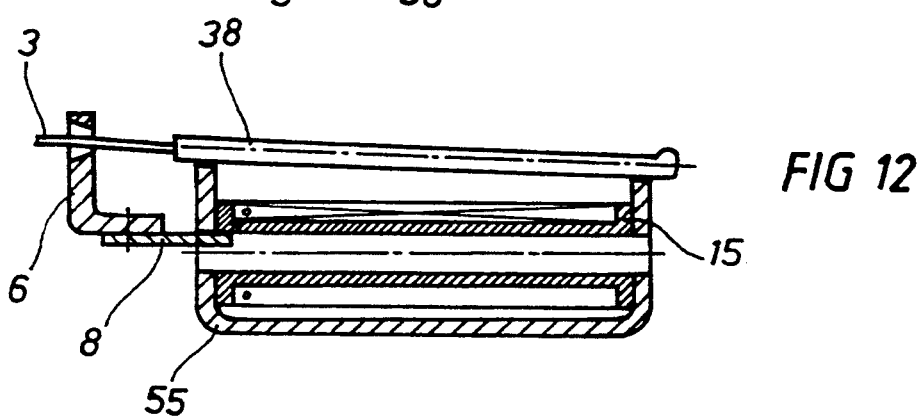
FIG. 12: the embodiment of a coil body in yoke form.

FIG. 12 shows the electrical coil according to the invention, which here is not in the form of a sleeve body but rather is embodied as a yoke. The coil 15 in an intrinsically magnetic action, where the magnetic lines are closed via the yoke, is disposed in a yoke 55. The solder wire 3 is now guided outside the yoke 55, in the retaining part 38, and transported by means of the clamping part 6. The yoke embodiment has the advantage of saving weight and of being less expensive to construct.

Figure 6A:
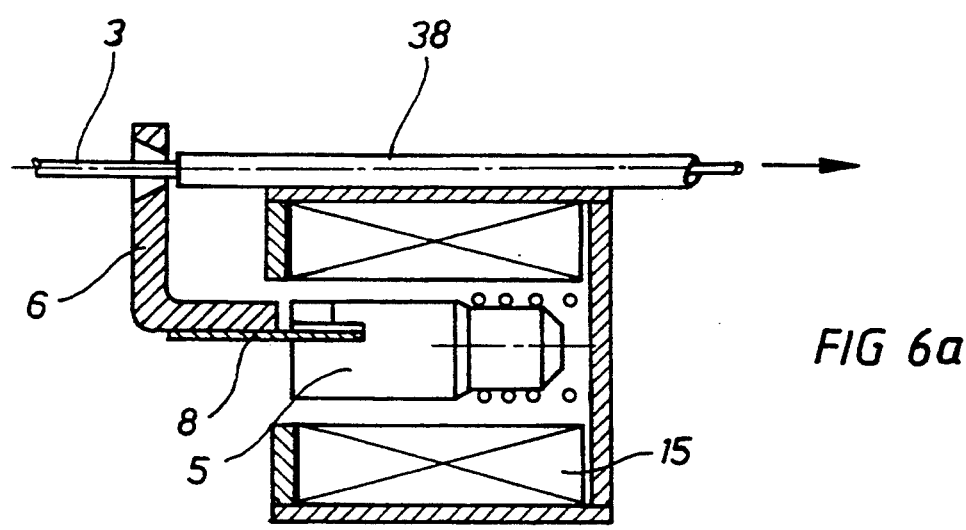
FIG. 6a: a further modification of the feed device.

A retaining part 7, which is shown in further detail in section in FIG. 6, is firmly joined to the forward end of the armature 5. The retaining part 7 substantially comprises a simple body that at its forward end defines a bore 40, which is accordingly firmly joined to the armature 5 itself.

A clamping part 6 is contrarily pivotably disposed with respect to the armature 5, with the pivoting being effected via a spring 8 embodied as a leaf spring.

The spring 8, preferably embodied as a spiral (flat) spring, is retained here in a slit 30 of the armature 5 and is secured by a screw 29. The spring 8 reaches outward via the front end of the armature 5, and in the region of a gap 34 between the forward end of the armature 5 and the rearward end of the clamping part 6 it forms a free flexible segment, which assures the free pivotability of the clamping part 6 in the directions of the arrows 31, 32. The prerequisite here is also that a play 35 be present between the forward end of the clamping 6, which as shown in FIGS. 3 and 4 is embodied approximately in disk-like fashion and has a bore 9 with a cutting edge 10, in order to assure this tilting or pivoting of the clamping part 6 with respect to the retaining part 7 firmly joined to the armature.

The spring 8 is held in the clamping part 6 by a screw 33.

It is important that the clamping part 6 comprise a magnetizable material, preferably soft iron material, in order to be deflected in the direction of the arrow 31 by a corresponding radial magnetic field generated by the electrical coil 15.

In order to assure adequate resistance to mechanical abrasion for the cutting edge 10, it may be provided that the material in the circumferential region around the cutting edge 10 be different from the material of the clamping part 6. It may also be provided that the clamping part comprise a hardenable material that is magnetizable.

If a current is now passed through the electrical coil 15, preferably a pulsating direct current, then the armature is drawn in the feed direction 39 into the electrical coil 15, counter to the force of the spring 12, thereby biasing the restoring spring 12. As soon as this half wave of the current is past, the flow of current through the electrical coil 15 ceases; accordingly, in relative terms, this coil is turned off, and this brief time suffices to relax the restoring spring 12, in order to move the armature 5 back into the electrical coil 15 in the direction opposite the direction 39 indicated by the arrow.

In the forward motion of the armature 5 in the direction of the arrow 39, however, a radial magnetic field of the electrical coil has simultaneously acted upon the clamping part 6 and deflected it upward in the direction of the arrow 31, counter to the force of the spring 8, and as a result the bore 9 provided with the cutting edge 10 is displaced relative to the stationary bore 40 of the retaining part 7, resulting in the desired clamping effect. The two bores 9, 40 are accordingly wedged relative to one another and between them clamp the solder wire 3, which accordingly, upon a motion of the armature 5 in the direction of the arrow 39, is carried with it in this feed direction 39.

The clamping action upon the solder wire depends on various circumstances. One circumstance is the restoring force of the spring 8, and another, which is variable, is the magnitude of the radial magnetic field which acts upon the clamping part 6 in order to deflect it upward in the direction of the arrow 31. Both factors can be adjusted and selected to meet given requirements. The clamping action can also be adjusted and varied by means of how the cutting edge 10 in the clamping part 6 is embodied.

Upon the retraction of the armature 5, the restoring spring 12 relaxes, and once the electrical coil 15 has briefly been shut off, the radial magnetic field acting upon the clamping part 6 is absent, so that the entire clamping part is swiveled downward in the direction of the arrow 32, and as a result the two bores 9, 40 are centered relative to one another, and as a result the solder wire 3 is released by the cutting edge 10. The solder wire is secured against unintentional retraction contrary to the direction of the arrow 39 by the fact that frictional resistance exists in the delivery tube 9 and upon payout from the drum retainer 17, so that the drum retainer remains stationary, and only the armature 5 with the clamping device 6 and the retaining part 7 moves rearward, without taking the solder wire 3 along with it toward the rear in the direction contrary to that of the arrow 39.

It is important that the central bore in the electrical coil be dimensioned such that although the armature 5 can easily be moved back and forth in the direction of its longitudinal axis, nevertheless essentially canting forces upon the armature do not lead to canting of this armature in this central bore of the electrical coil 15, and these canting forces act solely upon the clamping part 3.

Figure 2:
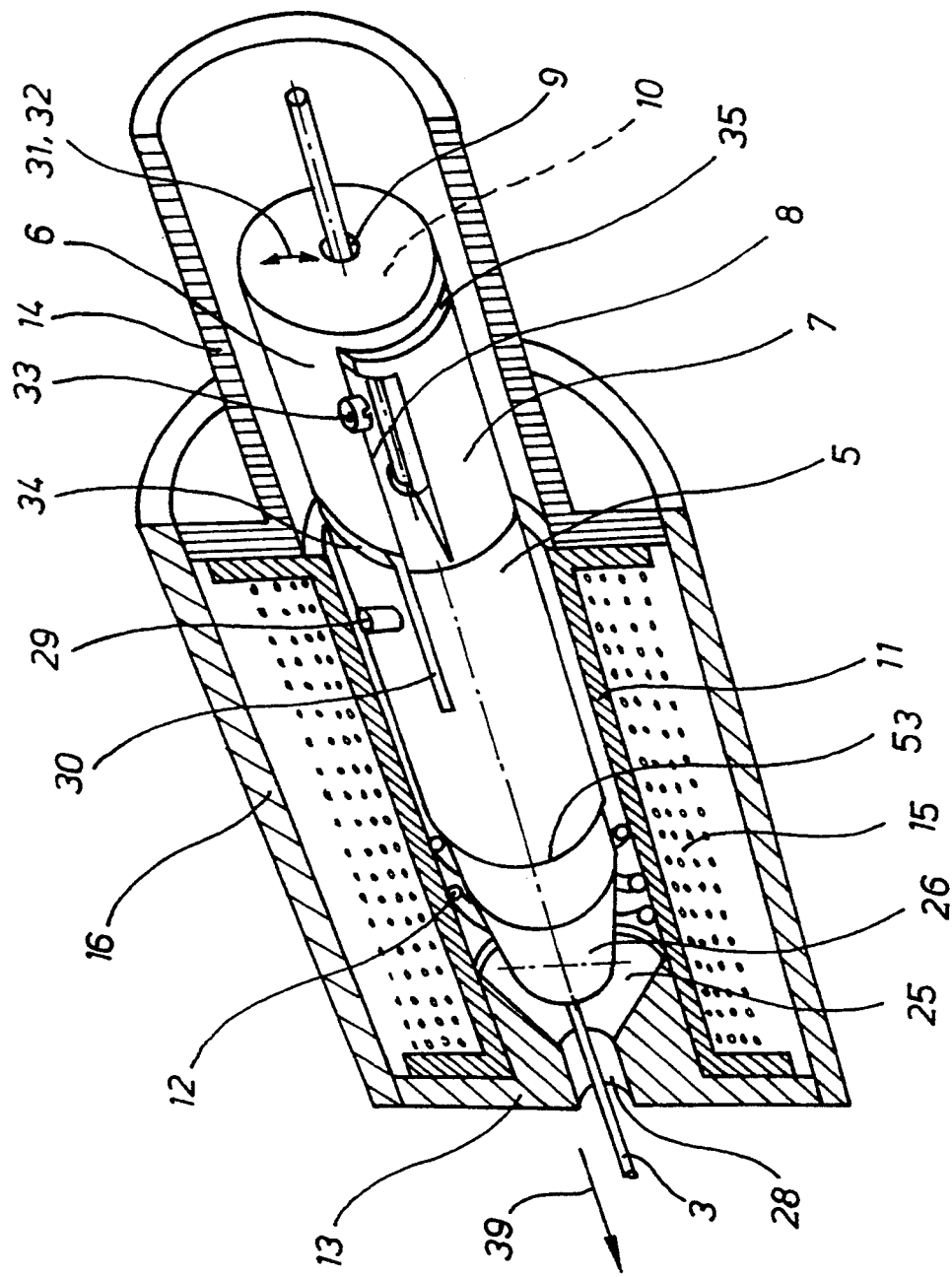
FIG. 2: an enlarged view of the soldering iron of FIG. 1, in a partly modified embodiment.

For further centering of the armature in the electrical coil, it may be provided as shown in FIG. 1 that the aforementioned tube 54 be disposed on the centering sleeve 26; this tube then reaches through a bore in the electrical coil and thus secures the armature against canting.

It is important that the rear pole piece 14, attached to the rear end of the electrical coil, have a larger diameter than the inside diameter of the electrical coil 15 within which the armature is movable, in order to provide the clamping part 6 with the desired canting play in the directions of the arrows 31, 32. The clamping part be may be smaller in diameter, to provide the necessary play. Then the diameters of the inside diameters of the coil 15 and the pole piece 14 could be identical.

FIGS. 3 and 4 show the clamping part 6 in section and in a front view, and it can be seen that the cutting edge 10 is embodied as a conical bore. Of the screw 33, only the fastening thread with which the retaining part is joined to the spring 8 is shown.

FIG. 5 shows a further embodiment of a clamping device; in comparison with FIG. 2, instead of the retaining part 7 a retaining part 38 is used, which substantially comprises a length of a tube that is attached on its face end to the rear end of the armature 5. It is important that the retaining part 7, 38 comprise a nonmagnetic material.

FIG. 6 shows the retaining part 7 in section as in FIG. 2, and it can be seen that the solder wire 3 is passed through the bore 40 that is structurally connected to the armature; the pivotable bore (directions of the arrows 31, 32—FIG. 5) of the clamping part 6 then faces this bore 40.

FIG. 7 shows an alternative for delivery of solder wire, wherein instead of the drum retainer 17 shown in FIG. 1, the read end of the handle 1 is provided with a central recess 41. It is also noted that the soldering tube 19 is retained in a fastening part 22 on the front end of the handle 1 of the soldering iron.

Figure 8:
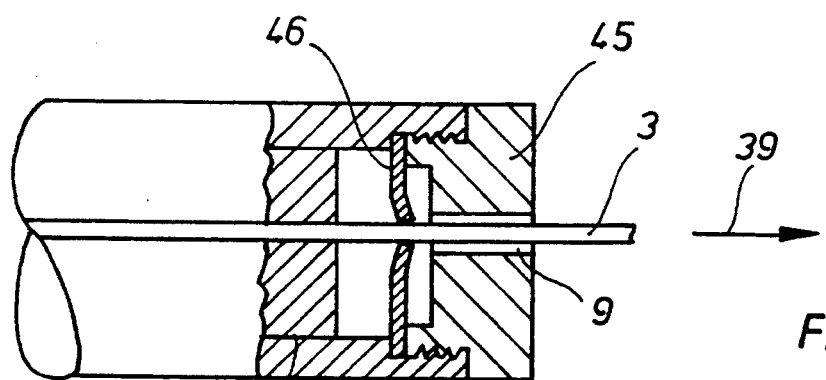
FIG. 8: a further embodiment of a clamping device, seen in section.
Figures 9, 10:
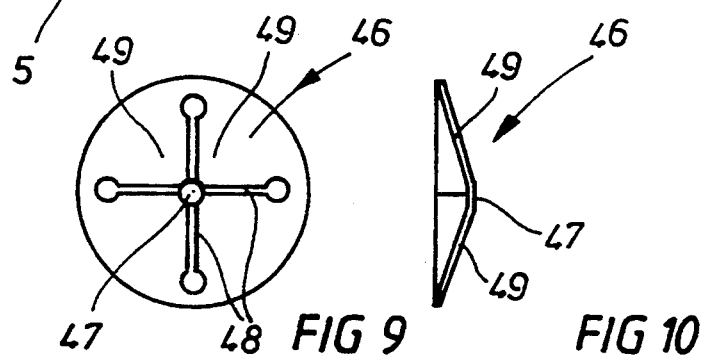
FIG. 9: the end view of the clamping part.
FIG. 10: the section through the clamping part.

In FIGS. 8-10, the further embodiment of a clamping device is shown, which is likewise encompassed by the concept of the invention. In this clamping device, the action of radial magnetic fields is not necessary in order to make a clamping part tilt. This clamping part 6 is contrarily always in clamping engagement with the solder wire 3. According to FIGS. 9 and 10, the clamping part 46 substantially comprises a diaphragm-like part, which has radial slits 48 distributed over its circumference and discharging into a central bore 47. This bore 47 is embodied as a cutting edge 10. To secure the slits 48 against tearing in the diaphragm-like part, the outer radial ends of the slits are widened by means of corresponding bores.

The clamping part 46 is bendable like a diaphragm cell or a sheet-metal diaphragm, so that the individual clamping segments 49, defined by the slits 48, press clampingly and resiliently against the outer circumference of the solder wire 3.

The entire clamping part 46 is of either a plastic material, a metal material, or a soft elastic material, such as rubber, natural rubber, or the like.

The clamping part 46 is installed in the armature 5 on the front end and is secured by a front retainer 45.

Once the clamping segment 49 are in continuous clamping engagement with the solder wire 3, the solder wire is always carried along with the forward motion of the armature 5 in the feed direction 39. A return motion of the solder wire in the direction contrary to the direction of the arrow 39 is prevented, however, by the fact that the frictional resistances at the solder wire are so major that the wire remains unmoving, while the clamping device 46 slips over it. Because of the embodiment of the clamping element 46 in the form of a diaphragm curved outward, a toggle lever effect accordingly occurs, as a result of which the clamping segments 49 deform resiliently outward and thereby generate a slight friction at the solder wire 3, which does not carry this solder wire along in the direction contrary to the feed direction 39.

Figure 11:
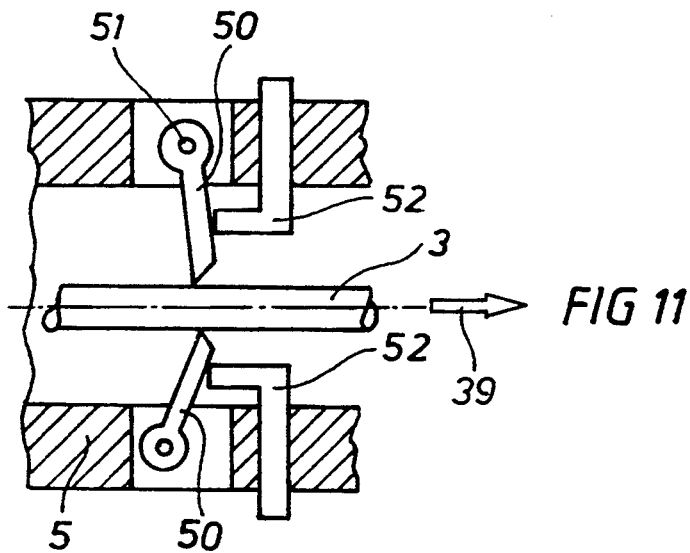
FIG. 11: a further embodiment of a clamping device in comparison with FIG. 8.

FIG. 11 shows an alternative to this embodiment. There, it is shown that pivot bearings 51 are present in the armature 5 in the region of recesses radially distributed over the circumference; a latch 50 is pivotably supported in each pivot bearing 51, and each latch has a tip that digs into the surface of the solder wire 3. Stops 52 securely joined to the armature are also present; they assure that the deflection of the latches upon loosening of the solder wire counter to the direction of the arrow 39 is limited.

I claim:

1. An electromagnetic feed device in a soldering or welding gun, wherein solder or welding wire is disposed on a supply drum on the rearward end of the soldering or welding gun and beginning from the supply drum the soldering or welding wire is guided into the interior of the soldering or welding gun to the feed device, wherein the feed device grasps the solder or welding wire and carries it intermittently, via a delivery tube, to a tip of the soldering or welding gun, said feed device comprising:

an electrical coil having a longitudinally movable plunging armature therein;

said plunging armature having clamping means for grasping and moving the solder or welding wire relative to the soldering or welding gun in a feed direction when the plunging armature is actuated to move by an electric current flowing through the electrical coil, wherein said clamping means comprises:

a retaining part fixed on said plunging armature, and a clamping part resiliently supported on said plunging armature, wherein said clamping part (6) grasps and presses the solder or welding wire against said retaining part when the clamping part is magnetized by said electric current, wherein the plunging armature (5) comprises a soft iron material and has a central bore (28) for guiding the solder or welding wire (3), and the electrical coil (15) has a pulsating direct current flowing through it.

2. The feed device according to claim 1, wherein the feed direction is embodied to provide a clamping effect on the solder or welding wire, and the solder or welding wire (3) runs through a first, rigid bore of the retaining part, and the clamping part (6) has a second bore (9), embodied pivotably with respect to the retaining part, the first and second bores being aligned with one another in a position of repose.

3. An electromagnetic feed device in a soldering or welding gun, wherein solder or welding wire is disposed on a supply drum on the rearward end of the soldering or welding gun and beginning from the supply drum the soldering or welding wire is guided into the interior of the soldering or welding gun to the feed device, wherein the feed device grasps the solder or welding wire and carries it intermittently, via a delivery tube, to a tip of the soldering or welding gun, said feed device comprising:
an electrical coil having a longitudinally movable plunging armature therein;
said plunging armature having clamping means for grasping and moving the solder or welding wire relative to the soldering or welding gun in a feed direction when the plunging armature is actuated to move by an electric current flowing through the electrical coil,
wherein the clamping means is joined by a retainer (45) to the plunging armature (5) and comprises an outwardly curved clamping diaphragm, which has a central bore (47) at which segmental clamping segments (49) originate, each of said segmental clamping segments having a cutting edge at said central bore, each said cutting edge engaging the solder wire or welding wire (3) in the feed direction when the plunging armature is actuated to move by the electric current and slipping over the solder wire when the plunging armature returns to an unactuated position.

4. An electromagnetic feed device in a soldering or welding gun, wherein solder or welding wire is disposed on a supply drum on the rearward end of the soldering or welding gun and beginning from the supply drum the soldering or welding wire is guided into the interior of the soldering or welding gun to the feed device, wherein the feed device grasps the solder or welding wire and carries it intermittently, via a delivery tube, to a tip of the soldering or welding gun, said feed device comprising:
an electrical coil having a longitudinally movable plunging armature therein;
said plunging armature having clamping means for grasping and moving the solder or welding wire relative to the soldering or welding gun in a feed direction when the plunging armature is actuated to move by an electric current flowing through the electrical coil,
wherein the clamping means has individual latch elements (50), which are pivotedly supported in the plunging armature (5), and cutting faces of the latch elements (50) engage the solder wire or welding wire (3) in the feed direction as respective stops on said armature limit pivoting of the latch elements when the plunging armature is actuated to move by the electric current and slip over the solder wire when the plunging armature returns to an unactuated position.

5. An electromagnetic feed device in a soldering or welding gun, wherein solder or welding wire is disposed on a supply drum on the rearward end of the soldering or welding gun and beginning from the supply drum the soldering or welding wire is guided into the interior of the soldering or welding gun to the feed device, wherein the feed device grasps the solder or welding wire and carries it intermittently, via a delivery tube, to a tip of the soldering or welding gun, said feed device comprising:
an electrical coil having a longitudinally movable plunging armature therein;
said plunging armature having clamping means for grasping and moving the solder or welding wire relative to the soldering or welding gun in a feed direction when the plunging armature is actuated to move by an electric current flowing through the electrical coil,
wherein said clamping means comprises:
a retaining part fixed on said plunging armature, and
a clamping part resiliently supported on said plunging armature,
wherein said clamping part (6) grasps and presses the solder or welding wire against said retaining part when the clamping part is magnetized by said electric current,
further comprising a yoke and pole element, which has therein the electrical coil (15) with the plunging armature (5), the plunging armature having the clamping means supported thereon by a spiral spring (8), wherein the solder or welding wire (3) is guided outside the electrical coil (15) by a retaining part (38).

6. An electromagnetic feed device in a soldering or welding gun, wherein solder or welding wire is disposed on a supply drum on the rearward end of the soldering or welding gun and beginning from the supply drum the soldering or welding wire is guided into the interior of the soldering or welding gun to the feed device, wherein the feed device grasps the solder or welding wire and carries it intermittently, via a delivery tube, to a tip of the soldering or welding gun, said feed device comprising:
an electrical coil having a longitudinally movable plunging armature therein;
said plunging armature having clamping means for grasping and moving the solder or welding wire relative to the soldering or welding gun in a feed direction when the plunging armature is actuated to move by an electric current flowing through the electrical coil,
wherein said clamping means comprises:
a retaining part fixed on said plunging armature, and
a clamping part resiliently supported on said plunging armature,
wherein said clamping part (6) grasps and presses the solder or welding wire against said retaining part when the clamping part is magnetized by said electric current,
further comprising:

a restoring spring (12) disposed on the plunging armature (5), a pole piece (14) extending outward from the electrical coil (15), a cutting edge (10) on said clamping part (6) to grasp the solder or welding wire, wherein when the clamping part is magnetized the clamping part is tilted and the solder or welding wire is grasped in scissors-like fashion between the cutting edge (10) and the retaining part.

7. The feed device according to claim 6, wherein the armature (5) oscillates at a power supply frequency and enters the electrical coil (15) in the feed direction, and the restoring element is embodied to provide a restoring motion to the plunging armature (5).

* * * * *